Figure 1:
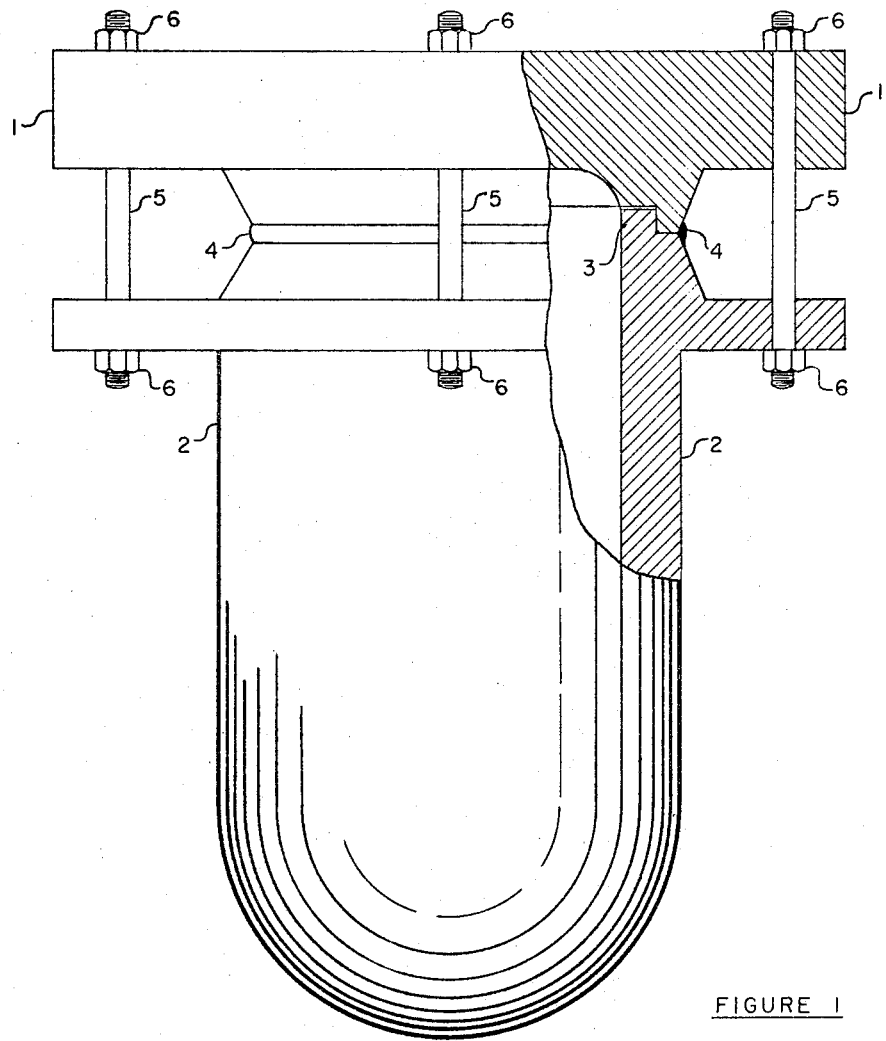

Sept. 6, 1966  A. CHRISTENSEN  3,270,906
CLOSURE FOR PRESSURE VESSELS
Filed Sept. 25, 1963  3 Sheets-Sheet 1

FIGURE I

AXEL CHRISTENSEN
INVENTOR.

BY J. T. Chaboty
AGENT

Sept. 6, 1966 A. CHRISTENSEN 3,270,906
CLOSURE FOR PRESSURE VESSELS
Filed Sept. 25, 1963 3 Sheets-Sheet 3

AXEL CHRISTENSEN
INVENTOR.

BY J. T. Chaboty
AGENT

United States Patent Office 3,270,906
Patented Sept. 6, 1966

3,270,906
CLOSURE FOR PRESSURE VESSELS
Axel Christensen, Stamford, Conn., assignor to Chemical Construction Corporation, New York, N.Y., a corporation of Delaware
Filed Sept. 25, 1963, Ser. No. 311,518
4 Claims. (Cl. 220—3)

The present invention retates to an improved closure apparatus for pressure vessels such as autoclaves and catalytic converters. The relatively simple arrangement of the present invention provides effective sealing against internal fluid pressure, while eliminating sealing gaskets or other devices of the prior art.

Numerous devices and apparatus arrangements have been suggested for high pressure sealing of autoclaves and converters. Specially designed closures are required in cases such as ammonia or methanol converters, which contain a catalyst charge through which a fluid process stream is passed at presures in the range of 100 to 1000 atmospheres. The basic principle of most closure devices of the prior art involves the provision of high surface pressure at the interface between the parts which are joined together, through the use of tension elements such as bolts. In this manner, an effective seal against leakage of pressurized fluid is established. In most cases a gasket is provided at the interface. The gasket may generally be either ductile such as a metallic gasket, or flexible such as a plastic or composition type. In any case, the gasket serves to reduce the force required for effective sealing of the joint.

Self-tightening closures such as the Bridgeman type may also be mentioned. In this type of closure, the force producing the tight joint is provided by the internal fluid pressure which is exerted on the closure member, which is typically a vessel cover. With large diameter vessels, this force becomes so large that gaskets of larger size than required for tightness must be provided, in order to distribute the force. In addition, the vessel wall must be reinforced to take the thrust from the gasket load.

These various high pressure closures of the prior art are quite expensive to fabricate, and require precise adjustment or alignment of parts to achieve complete sealing. Accurate machining is required in most cases, and the machined sealing surfaces must be preserved in perfect condition prior to assembly. Any handling damage such as surface scratches etc. will result in imperfect sealing at elevated pressure. The gaskets are also subject to injury and must be handled with great care. The very accurate machining of parts which is required in order to match the several parts within close tolerances is quite costly, and constitutes a substantial proportion of the total cost of fabricating the pressure vessel.

The high pressure closure of the present invention is based on an approach to fluid sealing which is quite divergent from prior art concepts. The apparatus of the present invention achieves sealing by means of a seal weld which is not stress bearing. The weld is externally applied at the interface between the parts, which are joined together by suitable means such as tension bolts. Sufficient tension is provided in the bolts to maintain the seal weld under compression during elevated pressure service. Thus, the seal weld does not contribute to the strength of the vessel but instead merely acts as a plug seal against fluid leakage at the interface. Due to the very small clearance between parts at the interface, the effective area over which internal fluid pressure can act against the weld is minimal, and the seal weld thus readily maintains its structural integrity and provides total sealing in service.

In a preferred arrangement of the apparatus of the present invention, the closure bolts are pre-stressed by means of levers which act to provide tension on the bolts. The lever action is obtained by providing secondary tension bolts, which exert force on the lever and are fastened to the apparatus element which is positioned for closure, such as a vessel cover.

The apparatus of the present invention provides significant advantages as compared to the prior art. Thus, the expensive and precise machining of parts such as the contact surface of the high pressure joint is no longer required. In addition, gaskets are no longer needed and the possibility of leakage at a gasketed joint is obviated. Finally, the danger of leakage of the joint due to damage such as scratching during assembly is eliminated. It will be evident that the total cost of vessels provided with the high pressure closure of the present invention is greatly reduced.

It is an object of the present invention to provide an improved closure for pressure vessels.

Another object is to provide an improved joint for closure against elevated pressure.

A further object is to provide a simplified and effective total closure for pressure vessels.

An additional object is to provide a closure for pressure vessels which does not require accurate and costly machining of parts.

Still another object is to provide a gasket-free closure for pressure vessels.

These and other objects and advantages of the present invention will become evident from the description which follows. Referring to the figures, FIGURE 1 is an elevation view of a generalized version of the closure of the present invention, and FIGURE 2 is an elevation view of a preferred embodiment of the closure of the present invention.

Figure 2:
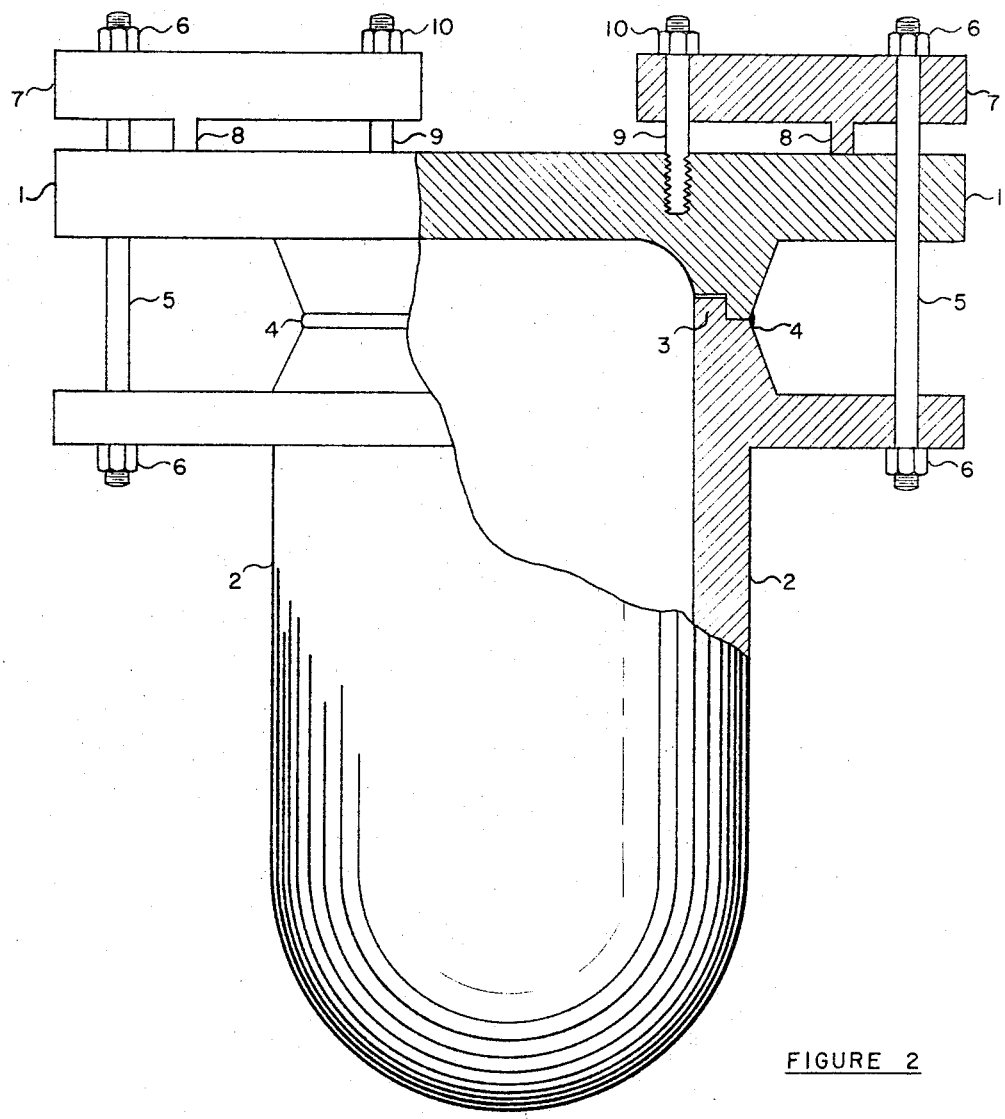

In FIGURE 1, cover 1 is placed on vessel body 2, and is preferably positioned by means of projection 3, which is provided on the interface surface of body 2. A companion recess is provided in the cover 1 above the projection 3, so that the cover is readily positioned in place. The fluid sealing weld 4 is now applied at the outer edge of the interface between the cover 1 and the vessel body 2. The closure bolts 5 having terminal nuts 6 are now fastened between the cover 1 and the vessel body 2. The bolts 5 are now pre-stressed to a tension which corresponds to the load the gas pressure will exert on the bottom of the cover 1, plus the load required in order to keep the contact surface between the cover 1 and the body 2 in compression. In this manner, the seal weld 4 is maintained under compression at all times, and does not contribute to the strength of the vessel. Thus, the weld 4 merely provides a plug seal against leakage of internal pressure. It will be evident that the force exerted by the internal pressure against the weld 4 is minimal, since the surface over which the pressure is exerted corresponds to the clearance of the interface, which is equivalent to a very small area.

The outer walls of the cover 1 and the vessel 2 are preferably sloped inwardly toward the interface and weld 4. This feature is desirable in that a smaller total area is provided for internal fluid pressure to act against the cover 1, and consequently the total force exerted against the cover is reduced. The net reduction in the wall thickness which results due to the inward slope of the walls is compensated for by the flanges on the body 2 and the cover 1.

Although the cover 1 is preferably circular and the vessel body 2 is correspondingly cylindrical, the closure concept of the present invention is applicable to other vessel configurations, such as a flanged opening in the side of a large pressure vessel. Inlet and outlet openings for process fluid have not been shown, however it will be appreciated that such apparatus elements will be provided in practice and may be of conventional design.

Referring now to FIGURE 2, a preferred embodiment of the present invention is illustrated, which is particularly applicable to vessels of large diameter. In such cases, it is desirable to pre-stress the main closure bolts. This is done by means of smaller tension bolts, which provide a pre-stress action based on leverage. Thus, in FIGURE 2, cover 1 is provided over an opening in vessel body 2. As described supra, with respect to FIG. 1, a projection 3 is preferably provided at the interface between elements 1 and 2, together with a companion recess. An outer seal weld 4 is provided for closure. Main closure bolts 5 and nuts 6 are provided as in FIG. 1, for closure between the flanges of cover 1 and vessel body 2. However, the upper nuts 6 do not act against the flange of cover 1, but instead are tightened against lever element 7, which is provided with pivot 8. Lever 7 is pivoted about element 8 by tension bolts 9, which are provided with nuts 10. The main closure bolts 5 are first pre-stressed to an intermediate tension by tightening of nuts 6, and then nuts 10 are tightened to provide the final operating stress in bolts 5. Due to the lever principle, and the fact that tension bolts 9 act with a greater lever arm than closure bolts 5, the torque which is applied to nuts 10 to achieve the required stress in bolts 5 is substantially reduced, compared to that which would be required to apply stress to bolts 5 in the conventional manner, by tightening of upper nuts 6 against the flange of cover 1.

Numerous alternatives within the scope of the present invention will occur to those skilled in the art. Thus, seal weld 4 preferably consists of metallic weld material which is applied in the molten state. However, element 4 may alternatively consist of a suitable adhesive material, such as epoxy resin.

Levers are shown as individual elements for each bolt 5. An equivalent structure would consist of a single flat circular ring above cover 1, provided with bolt holes for bolts 5 and 9 and a lower projection or separate ring to serve the function of pivot 8.

Finally, the interface between cover 1 and vessel body 2 is shown provided with projection 3 and a companion recess in cover 1. Alternate configurations such as a tongue and groove arrangement, or even a flat interface, may also be provided.

The bolts 5 have been shown in the figures with substantial spacing away from the wall of vessel 2. It will be obvious to those skilled in the art that, in practice, bolts 5 will be positioned immediately adjacent to the wall of vessel 2, so as to provide minimum bending stress or torsion on the flanges of vessel 2 and cover 1.

It will be evident that the high pressure closure of the present invention is applicable to numerous types of pressure vessels, such as autoclaves or synthesis converters for ammonia or methanol. In addition, the closure of the present invention is also applicable as a high pressure joint for joining pressure piping, or for other closures between apparatus elements under high pressure. In particular, it will be desirable in some instances to provide cover 1 of FIG. 1 with a central upward extension, so as to provide internal clearance for apparatus inside the pressure vessel. Thus, cover 1 may alternatively be of hemispherical shape, or it may even be feasible to provide cover 1 with an upward central equivalent to vessel body 2. In this case, the high pressure joint would essentially extend between two identical and opposite apparatus elements, with internal process apparatus extending within both the upper and lower outer elements. An arrangement of this type is illustrated in FIGURE 3.

Figure 3:
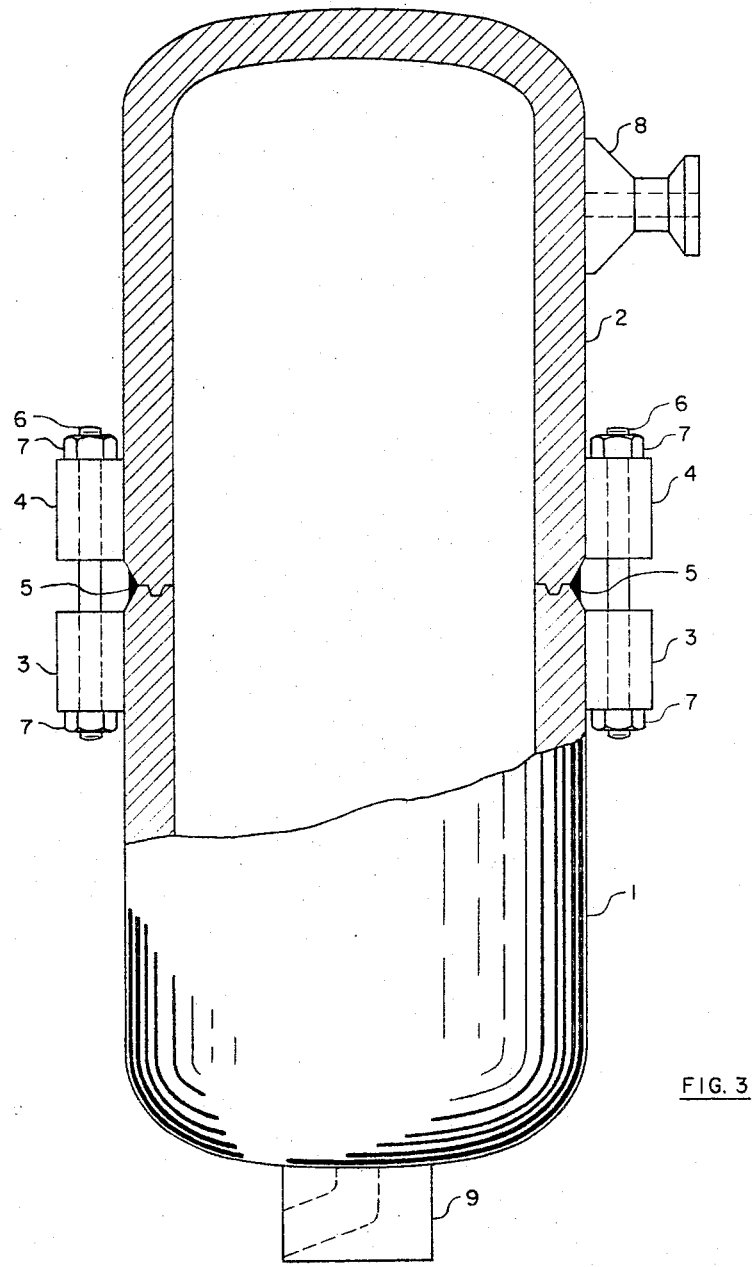

Referring to FIGURE 3, the pressure vessel consists of lower body portion 1 and upper body portion 2. Body portions 1 and 2 are provided with closure projections 3 and 4 respectively. The fluid sealing weld 5 is applied at the outer edge of the interface between the body portions 1 and 2. The closure bolts 6 having terminal nuts 7 are fastened between projections 3 and 4. The bolts are pre-stressed to a tension which corresponds to the load which internal fluid pressure exerts within the vessel, plus the load required to keep the contact surface at the interface under compression. Thus, the seal weld 5 is maintained under compression during normal operation and does not contribute to the strength of the vessel. Instead, the weld 5 merely provides a plug seal against leakage of internal pressure. The force exerted by internal pressure against seal weld 5 is minimal, because the surface over which the pressure is exerted corresponds to the clearance of the interface, which is equivalent to an area of negligible dimension. Upper and lower fluid passage means 8 and 9 are provided, whereby process fluid under elevated pressure may be passed through the vessel. It will be evident that the closure means provided for the pressure vessel of FIG. 3 are functionally equivalent to the closure of FIG. 1, except that the cover 1 of FIG. 1 is replaced by the body portion 2 of FIG. 3. In addition, it will readily occur to those skilled in the art that individual projections 3 and 4 may alternatively consist of opposed continuous flange elements provided with drilled holes. Other alternatives and functionally equivalent apparatus configurations within the scope of the preesnt invention will readily occur to those skilled in the art.

I claim:

1. A pressure vessel with improved closure assembly comprising a vessel body, a cover extending over an opening in said body, a plurality of external closure bolts having terminal nuts and extending between said body and said cover, a plurality of levers, each of said closure bolts being attached to one of said levers, said levers pivoting on said cover and extending between said closure bolts and a plurality of tension bolts attached to said cover, each of said tension bolts being attached to one of said levers by means cooperating with said levers, whereby said tension bolts are put under tension and whereby said tension bolts exert tension on said closure bolts through said levers, and an outer sealing weld at the interface between said body and said cover, said closure bolts being under tension whereby said weld is continuously maintained under compression when said vessel body is subjected to elevated internal pressure.

2. Apparatus of claim 1, in which said vessel body is cylindrical and said cover is circular.

3. Apparatus of claim 1, in which said vessel body is provided with a projection over a portion of said interface, and said cover is provided with a recess opposing said projection.

4. Apparatus of claim 1, in which said vessel body and said cover are provided with external surfaces which slope inwardly towards the interface, whereby the effective area over which the internal elevated pressure acts against said cover is reduced.

References Cited by the Examiner

UNITED STATES PATENTS

| | | | |
|---|---|---|---|
| 2,121,035 | 6/1938 | Hollister et al. | |
| 2,480,248 | 8/1949 | Karlsson et al. | |
| 2,544,789 | 3/1951 | Horelick et al. | 220—67 |
| 2,917,082 | 12/1959 | Platen | 29—452 X |
| 3,127,248 | 3/1964 | Koniewiez et al. | 23—289 X |
| 3,188,116 | 6/1965 | Christensen | 285—286 X |

MORRIS O. WOLK, *Primary Examiner.*

JOSEPH SCOVRONEK, *Assistant Examiner.*